June 8, 1926.

E. B. STALEY

END GATE CONTROL FOR DUMPING TRUCK BODIES

Filed June 6, 1925

INVENTOR
Earl B. Staley
BY
H.L. & H.L. Reynolds
ATTORNEYS

June 8, 1926.
E. B. STALEY
1,587,612
END GATE CONTROL FOR DUMPING TRUCK BODIES
Filed June 6, 1925　　2 Sheets-Sheet 2
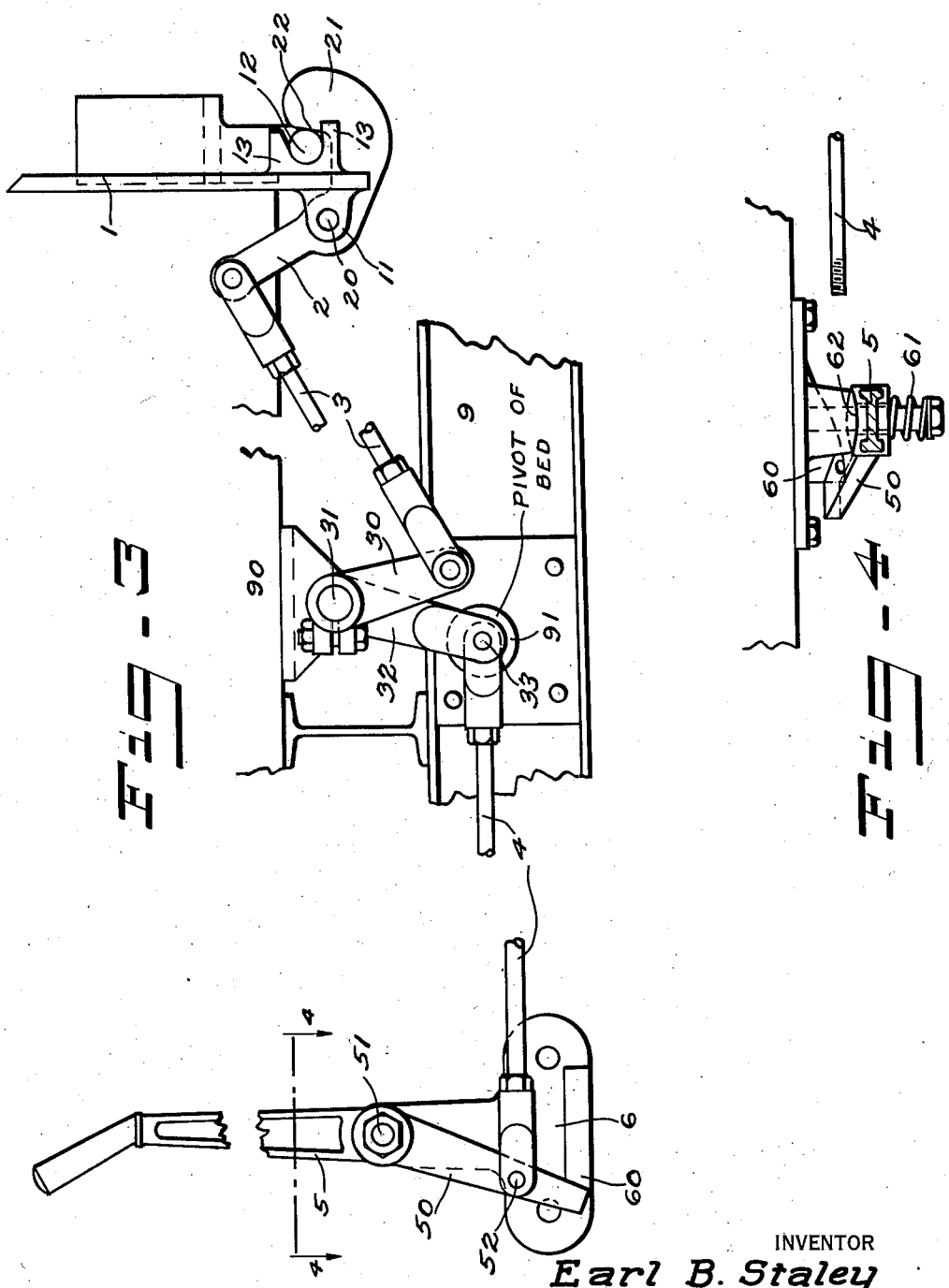
INVENTOR
*Earl B. Staley*
BY
*H.L.H.L. Reynolds*
ATTORNEYS Patented June 8, 1926.

1,587,612

UNITED STATES PATENT OFFICE.

EARL B. STALEY, OF SEATTLE, WASHINGTON.

END-GATE CONTROL FOR DUMPING TRUCK BODIES.

Application filed June 6, 1925. Serial No. 35,331.

My invention relates to apparatus whereby a moving part, such, for instance, as a lock or latch mounted upon an apparatus which is itself mounted to swing or rock about a pivot, may be controlled from another part of the apparatus which does not participate in such rocking or pivoting movement.

The object of my invention is to provide a means whereby the operation of such movable parts may be controlled from a portion of the apparatus which does not participate in the swinging action of that part which carries the lock or latch. Specifically the object of my invention which I have chosen for its illustration, relates to the operation of a latch by which the end gate of a tilting-body truck, may be operated by the use of a lever mounted upon the chassis or other non-tilting portion of the truck.

The central feature of my invention consists in placing the pivotal connection between two members, one carried by the tilting-body and the other by the chassis so that in locked position of the part which is to be controlled, the axis of such pivotal connection lies in an extension of the axis upon which the tilting body turns, whereby the position of the latch or holding member is not affected by any amount of tilting of the body, and yet may be freely moved from the controlling lever mounted on the chassis at any time desired. My invention further consists in details in the particular construction of the parts by which the latch is controlled, and also the particular relation between the latch and the member engaged thereby, whereby the latch may be more easily released, and the frictional resistance to relative movements of the engaged surface is reduced to such a point as to be negligible.

The accompanying drawings illustrate my invention embodied in an apparatus whereby a swinging end gate mounted upon a tilting-body truck, may be controlled in its opening through a lever mounted upon the chassis.

Figure 3 is a side elevation showing the essential parts of the latch-controlling mechanism on an enlarged scale and in assembled relation.

Figure 4 is a detailed section taken upon the line 4—4 of Figure 3, illustrating a feature of the lever holding mechanism.

Figure 1:
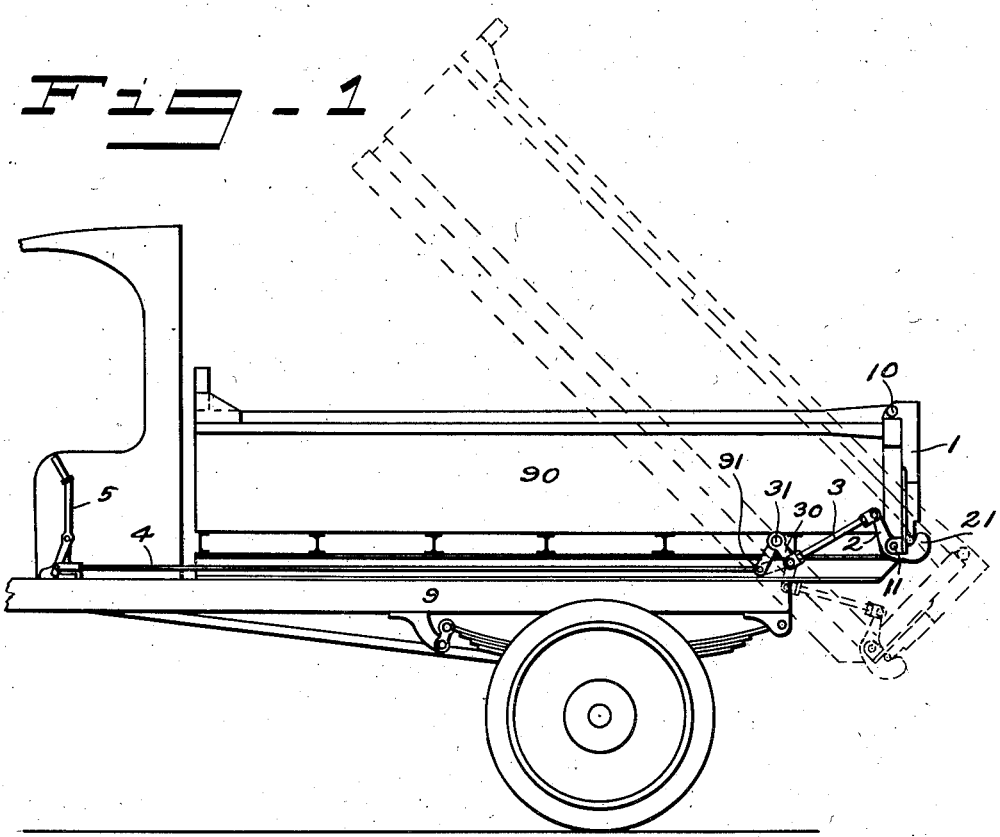
Figure 1 shows a side elevation of the body and corresponding portions of the chassis of such a tilting-body truck.

In the drawings 9 represents the chassis side bar of a truck, and 90 the body which is pivoted towards the rear end thereof so that its forward end may be tilted up. The axis upon which the truck body swings in tilting for dumping is represented at 91. The type of truck body illustrated has an end gate 1, pivoted at 10, which is at the upper edge of the end gate and held closed by two latches carried by the truck body at each side, and engaging with a member carried by the end gate. The latch, as more clearly illustrated in Figure 3, consists of a lever 2 which is pivoted at 20 upon an ear or ears 11 carried by the truck body. This lever has a swinging end 21 which is provided with a surface 22 facing forwardly of the truck when in locking position and adapted to engage a pin 12 or other member carried by the end gate. For convenience in securing accurate positioning of the pin 12 when the end gate is closed, a yoke 13 is mounted upon the truck body so as to receive the pin between its jaws. This yoke 13 and the pivot ears 11 are preferably mounted upon the same casting which is secured to the rear end of the truck body.

The lever 2 has its forward end connected through a link as 3 with an arm 30 secured upon a shaft 31. This shaft is preferably extended across and just beneath the truck body, and a corresponding arm 30 is secured to said shaft at the opposite side of the truck body. In fact the latch and the mechanisms for controlling the same are duplicated at opposite sides of the truck body.

Figure 2:
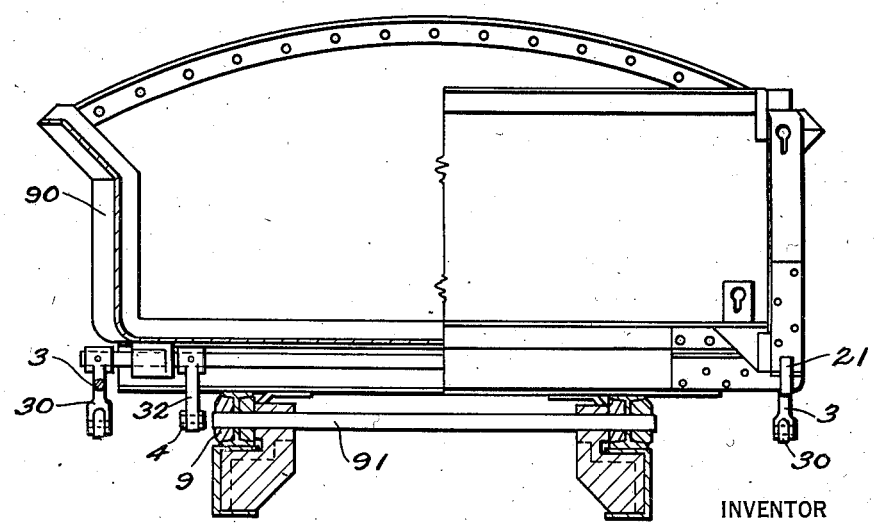
Figure 2 is a rear end view, the body of the truck and the chassis at one side being shown in section.

The shaft 31 is provided with an arm 32 to which is pivoted one end of a link 4. The pivotal connection between said arm and link is located in an extension of the axis of the shaft 91 upon which the truck body pivots when the latch 21 is in position to hold the end gate closed. There is, however, no physical connection between the arm 32 and the shaft 91 upon which the body pivots. The arm 32 is located closely adjacent to but outside of the end of the shaft 91, as is clearly shown in Figure 2. The rod 4 extends forwardly to a position adjacent the cab of the truck, or such other position as it may be desirable to locate it.

At this point it connects with the lever 5, which lever is pivoted at 51 and has a downwardly extending end 50 to which the link 4 is pivoted at 52. The holding and release of this lever may be accomplished in any acceptable manner. The particular manner illustrated in the drawings consists in providing upon the side of the truck or a frame member thereof, a plate 6 having a projecting flange 60, the squared end of which is so placed as to be engaged by the lower end of the arm 50 of the lever when the lever is in position to hold the latch closed. It is contemplated that the lever 5 shall be mounted upon the pivot 51 in such manner that it may be given a certain amount of side movement, that is movement in a direction extending transversely of the truck. This movement need only be enough to permit throwing the lower end of the lever outward sufficiently to clear the shoulder at the forward end of the flange 60, thereby permitting said lower end of the lever to be moved rearwardly, or in the position which effects the release of the latch.

To hold the lever securely in the position in which the latch is held in locked position, I provide a surface as 62 at the pivot of the lever 5, placed at such an angle that when the lever is held firmly up against this surface the lower end of the lever will engage the shoulder 60. To hold the lever 5 in such position and yet so that it may be moved laterally to release its lower end, I employ a spring 61, shown clearly in Figure 4, which holds the lever firmly and yet in a yielding manner against the surface 62.

I prefer to make the surface 22 upon the latch, which engages with the pin 12 or such other member as is carried by the end gate, at such an angle with reference to the direction of outward thrust of the end gate and the pivot point 20 of the latch that there is a slight incline acting in such a way as to contribute towards the movement of the latch into released position. Examination will show that the surface 22 upon the latch is inclined with relation both to the direction of outward swing of the pin 12 and with relation to a line extending from the point of contact between the latch and pin 12 and the pivot 20. This angle has a certain relation to the angle of repose between the character of the surfaces employed.

The tendency of the pressure between these surfaces to swing the latch into released position, should approximately balance or neutralize the friction, so that the latch is at all times in the critical position in which but little effort is required to cause it to move into releasing position. By so constructing these surfaces, very little effort is required to release the latch, and at the same time the strain upon the controlling members, as the links 3 and 4 and the connected parts, is but little, while holding the latch closed and also during the releasing action. Experience has shown that it requires but very little strain upon these parts to resist any releasing tendency and also to throw the latch into released position when this is desired.

In locks heretofore employed for holding end gates of the character herein illustrated, it has been found necessary to employ a good deal of force to throw the latch and release the end gate, and especially when the body has been raised in front or tilted to dumping position which position is shown by dotted lines in Figure 1. In this position of the body the contents of the bed are largely supported by the end gate, and without some provision for neutralizing the friction between the latch and the end gate, the release of the end gate is a very difficult matter.

By the particular construction of the latch controlling means herein illustrated and described, and particularly by reason of the location of the pivot 33 on an extension of the axis on which the body pivots, it is possible to have the controlling lever located in the cab where it may be operated by the driver without leaving his seat.

What I claim as my invention is:

1. The combination with a tilting truck body and a device for permitting dumping of the load when the body is tilted, of an operating lever for a releasing device located upon the truck chassis, and means connecting said operating lever with the releasing device which means includes a lever mounted to move with the truck body and means connecting the operating lever with said other lever by a pivot located upon the tilting axis of the truck body when the releasing device is in holding position.

2. A means for controlling the end-gate of a tilting-body truck including an end-gate-holding and releasing member mounted on the tilting body, a controlling member for said end-gate-holding member pivoted upon the truck chassis, and a transmission means connecting the end-gate-holding member with said controlling member, which means includes a pivot member aligned with the tilting axis of the truck body when said holding member is in end-gate-holding position.

3. The combination with a tilting body for a vehicle and a holding latch carried upon said body, of a latch controlling member carried upon a non-tilting portion of the vehicle and operative means connecting said controlling member with the latch, said means including a member pivoted upon the tilting body and connected with the controlling member through a pivot located coaxially with the pivot axis of the body when the latch is in holding position.

4. An end-gate holding and releasing mechanism for tilting-body trucks comprising a holding latch pivoted upon the truck body, a controlling lever pivoted upon the chassis, an intermediate lever pivoted upon the tilting body, a rod connecting said intermediate lever with the holding latch, and a rod connecting the same lever with the controlling lever, the pivot connection between said last rod and the intermediate lever being positioned coaxially with the tilting axis of the truck body when the latch is in holding position.

Signed at Seattle, King County, Washington, this 1st day of June 1925.

EARL B. STALEY.